(12) United States Patent
Tsuneki et al.

(10) Patent No.: US 10,012,961 B2
(45) Date of Patent: Jul. 3, 2018

(54) SERVO CONTROL DEVICE, SERVO CONTROL METHOD, AND COMPUTER READABLE RECORDING MEDIUM

(71) Applicant: FANUC CORPORATION, Yamanashi (JP)

(72) Inventors: Ryoutarou Tsuneki, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/639,851

(22) Filed: Jun. 30, 2017

(65) Prior Publication Data

US 2018/0011453 A1 Jan. 11, 2018

(30) Foreign Application Priority Data

Jul. 6, 2016 (JP) .................................. 2016-134274

(51) Int. Cl.
*G05B 13/00* (2006.01)
*G05B 13/04* (2006.01)

(52) U.S. Cl.
CPC .................................. *G05B 13/042* (2013.01)

(58) Field of Classification Search
CPC .................... H02P 8/14; G05B 19/416; G05B 2219/41123

See application file for complete search history.

(56) References Cited

U.S. PATENT DOCUMENTS

| 5,475,291 A | 12/1995 | Yoshida et al. |
| 2010/0176971 A1* | 7/2010 | Banerjee ............ G06K 19/041 340/928 |

FOREIGN PATENT DOCUMENTS

JP  H06-319284 A  11/1994

* cited by examiner

*Primary Examiner* — Karen Masih
(74) *Attorney, Agent, or Firm* — Studebaker & Brackett PC

(57) ABSTRACT

A servo control device includes a velocity command creation part configured to create a velocity command value for driving a servomotor; a velocity detection part configured to detect velocity of the servomotor; and a torque command creation part configured to create a torque command value using a difference between the velocity command value and the velocity detection value. The torque command creation part has an integral gain part and a proportional gain part, an integral gain and a proportional gain are obtained by multiplying a value calculated by multiplying an initial value by a ratio of load inertia of a machine relative to rotor inertia of the servomotor, by an integral gain magnification and a proportional gain magnification, respectively, and the integral gain magnification is set to a value smaller than the square of the proportional gain magnification according to a delay time of a velocity control loop.

9 Claims, 4 Drawing Sheets

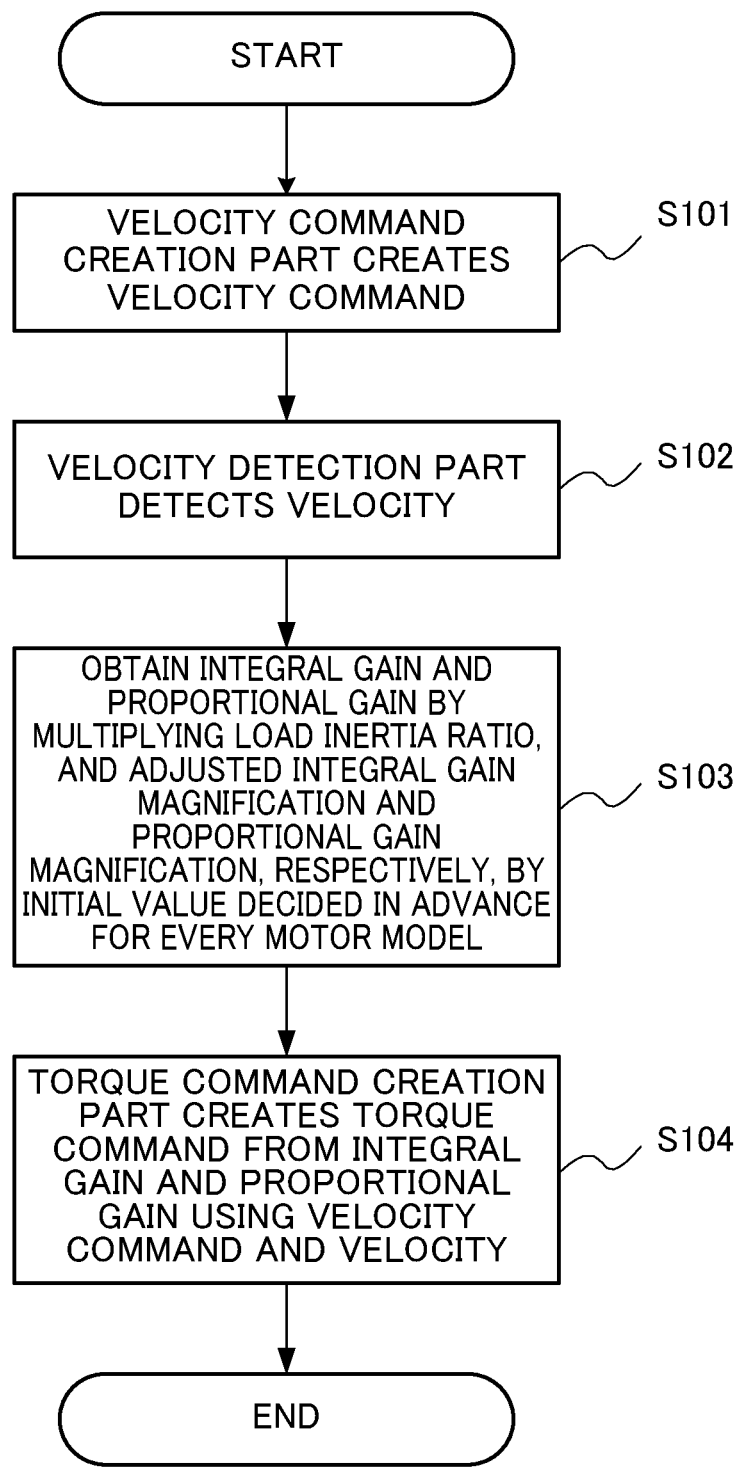

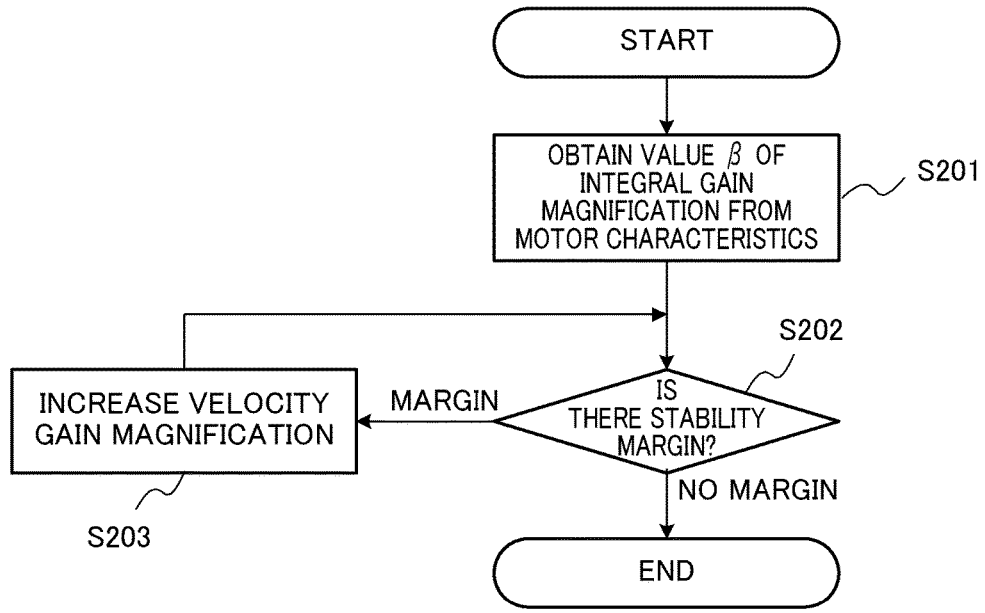
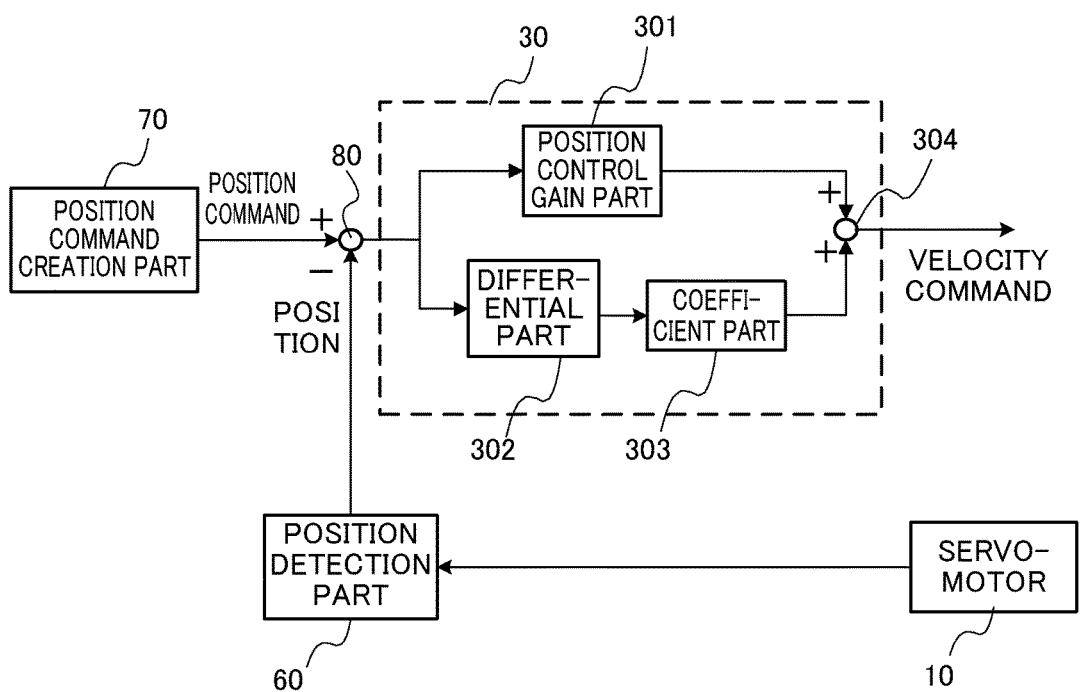

Kt: TORQUE CONSTANT
J = $J_m + J_L$: TOTAL INERTIA
Jm: ROTOR INERTIA
JL: LOAD INERTIA OF MACHINE

SERVO CONTROL DEVICE, SERVO CONTROL METHOD, AND COMPUTER READABLE RECORDING MEDIUM

This application is based on and claims the benefit of priority from Japanese Patent Application No. 2016-134274, filed on 6 Jul. 2016, the content of which is incorporated herein by reference.

BACKGROUND OF THE INVENTION

Field of the Invention

The present invention relates to a servo control device, servo control method and computer readable recording medium.

Related Art

A servomotor is used in applications that drive a feed axis, etc. A velocity control loop that controls the velocity of a servomotor generally adopts PID control, which includes a proportional gain, integral gain, and depending on the case, derivative gain. The optimum values for velocity control loop gain are decided depending not only on the motor, but also on the characteristics of the machine connected to the servomotor (load inertia ratio, resonance frequency, etc.).

The servomotor cannot decide the optimum values in advance due to being used as the drive shaft of various machines, etc. Therefore, the initial value for the velocity control loop gain is decided so as to have responsiveness for the motor alone, and for the velocity control loop gain, adjustment is performed so that responsiveness tailored to the machinery is obtained by multiplying this initial value by a constant. The initial value of the velocity control loop gain is decided for every motor so that the velocity control loop has responsiveness that is for the motor alone.

For example, Patent Document 1 discloses increasing the integral gain by the square of the proportional gain magnification in the case of a delay time not existing in the control system, in order to increase the responsiveness while keeping the damping characteristic constant.

Patent Document 1: Japanese Unexamined Patent Application, Publication No. H06-319284 (paragraphs 0109-0117)

SUMMARY OF THE INVENTION

However, delay such as the delay due to the responsiveness of the current control loop, which is inside of the velocity control loop, the delay of the signal of a speed detector, and the delay due to computation period of the speed control loop, exists in the velocity control loop. For this reason, if increasing the integral gain by the square of the proportional gain magnification, the velocity gain will be limited at the boundary according to only the integral gain, and it will not be possible to sufficiently raise the proportional gain.

The present invention has an object of providing a servo control device, servo control method, and computer readable recording medium that can raise responsiveness in the case of a delay time existing in the control system, by multiplying the integral gain by the appropriate magnification according to the delay time.

According to a first aspect of the present invention, a servomotor control device includes: a velocity command creation part that creates a velocity command value for driving a servomotor;

a velocity detection part that detects velocity of the servomotor; and a torque command creation part that creates a torque command value to the servomotor using a difference between a velocity command value created by the velocity command creation part and a velocity detection value detected by the velocity detection part;

in which a velocity control loop includes the velocity detection part and the torque command creation part;

the torque command creation part includes an integral gain part and a proportional gain part to which the difference is inputted, respectively;

integral gain of the integral gain part and proportional gain of the proportional gain part are obtained by multiplying a value calculated by multiplying an initial value decided in advance for every motor model by a coefficient established using a ratio of load inertia of a machine relative to rotor inertia of the servomotor, by an integral gain magnification and a proportional gain magnification, respectively; and the integral gain magnification is set to a value smaller than the square of the proportional gain magnification according to a delay time of the velocity control loop.

According to a second aspect of the present invention, in the servomotor control device as described in the first aspect, the integral gain magnification may be the $\beta$-th power of the proportional gain magnification, and the $\beta$ may be a constant assuming a value of one or more and less than two according to the delay time of the velocity control loop.

According to a third aspect of the present invention, in the servomotor control device as described in the second aspect, the constant $\beta$ may be defined, using a time delay $\tau$ of the velocity control loop and a constant $\alpha$, as $\beta=2-\alpha\tau$.

According to a fourth aspect of the present invention, the servomotor control device as described in any one of the first to third aspects may further include: a position command creation part that creates a position command value for the servomotor; and a position detection part that detects a position of the servomotor, in which the velocity command creation part may create a velocity command value using a difference between the position command value created by the position command creation part, and a position detection value detected by the position detection part.

According to a fifth aspect of the present invention, a servomotor control method for a servomotor control device includes the steps of: creating a velocity command value for driving a servomotor;

detecting velocity of the servomotor; and creating a torque command value to the servomotor using a difference between the velocity command value thus created and a velocity detection value thus detected, in which the servomotor is controlled according to the torque command value, at least the step of detecting velocity and the step of creating the torque command value is performed in a velocity control loop, the step of creating the torque command value includes a step of multiplying the difference by an integral gain and a proportional gain, respectively, the integral gain and the proportional gain are obtained by multiplying a value calculated by multiplying an initial value decided in advance for every motor model by a coefficient established using a ratio of load inertia of a machine relative to rotor inertia of the servomotor, by an integral gain magnification and a proportional gain magnification, respectively, and the integral gain magnification is a value smaller than the square of the proportional gain magnification according to a delay time of the velocity control loop.

According to a sixth aspect of the present invention, in the servomotor control method as described in the fifth aspect, the integral gain magnification may be the β-th power of the proportional gain magnification, and the β may be a constant assuming a value of one or more and less than two according to the delay time of the velocity control loop.

According to a seventh aspect of the present invention, in the servomotor control method as described in the sixth aspect, the constant β may be defined, using time delay τ of the velocity control loop and a constant α, as β=2−ατ.

According to an eighth aspect of the present invention, the servomotor control method as described in any one of the fifth to seventh aspects may further include the steps of:
creating a position command value for the servomotor; and detecting a position of the servomotor,
in which the step of creating the velocity command value creates a velocity command value using a difference between the position command value created by the position command creation part, and a position detection value detected by the position detection part.

According to a ninth aspect of the present invention, a servomotor control program enables a computer, serving as a servomotor control device that controls a servomotor, to execute processing of:
creating a velocity command value for driving the servomotor;
detecting a velocity of the servomotor; and
creating a torque command value for the servomotor using a difference between the velocity command value thus created and a velocity detection value thus detected,
in which at least the processing of detecting the velocity and the processing of creating the torque command value is executed in a velocity control loop,
the processing of creating the torque command value multiplies the difference by the integral gain and the proportional gain, respectively,
the integral gain and the proportional gain are obtained by multiplying a value calculated by multiplying an initial value decided in advance for every motor model by a coefficient established using a ratio of load inertia of a machine relative to rotor inertia of the servomotor, by an integral gain magnification and a proportional gain magnification, respectively, and
the integral gain magnification is a value smaller than the square of the proportional gain magnification according to a delay time of the velocity control loop.

According to the present invention, it is possible to raise responsiveness in the case of a delay time existing in a velocity control loop, by multiplying the integral gain by the appropriate magnification according to the delay time.

BRIEF DESCRIPTION OF THE DRAWINGS

FIG. 2 is a flowchart showing operations of the servomotor control device shown in FIG. 1;

FIG. 3 is a flowchart showing a method of obtaining a velocity gain;

FIG. 4 is a block diagram showing a velocity command creation part, position detection part, position command creation part, and servomotor;

DETAILED DESCRIPTION OF THE INVENTION

Hereinafter, an embodiment of the present invention will be explained in detail using the drawings. Technology premised on the embodiment of the present invention will be explained for the case of delay time not existing in the velocity control loop. From the point of the rigidity of the machine not being high conventionally, and a filter technology for avoiding machine resonance of high frequency being insufficient, the magnification multiplied to the initial value for the velocity control loop gain has not been set very high.

Figure 5:
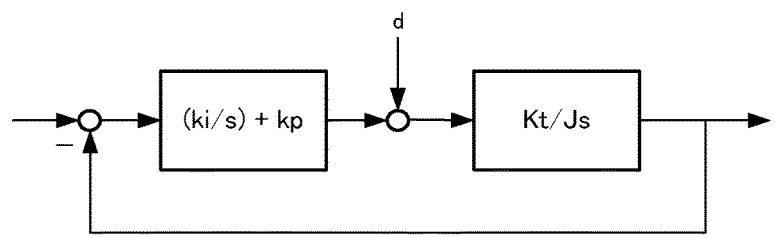
FIG. 5 is a block diagram of a control system in a case of delay time not existing at all in the control system.

However, the magnification multiplied to the initial value for the velocity control loop gain has been rising due to the rigidity of the machine become higher, and improvements in the filter technology for avoiding machine resonance. Letting delay time not exist at all in the control system, the block diagram of the control system will be a block diagram such as that shown in FIG. 5. A transfer function from disturbance d until output y is Numerical Formula 1 (shown as Formula 1).

$$\frac{y}{d} = \frac{\frac{K_t}{J}s}{s^2 + \frac{K_t k_p}{J}s + \frac{K_t k_i}{J}} = \frac{\frac{K_t}{J}s}{s^2 + 2\zeta\omega_n s + \omega_n^2} \quad \text{[Formula 1]}$$

The integral gain $k_i$ and proportional gain $k_p$ become a numerical formula (shown as Formula 2) when expressed by cut-off frequency $\omega_n$ and damping coefficient $\zeta$.

$$k_i = \frac{J}{K_t}\omega_n^2 = \left(1 + \frac{J_L}{J_m}\right) \times \frac{J_m}{K_t}\omega_n^2 \quad \text{[Formula 2]}$$

$$k_p = \frac{2\zeta J}{K_t}\omega_n = \left(1 + \frac{J_L}{J_m}\right) \times \frac{2\zeta J_m}{K_t}\omega_n$$

Formula 2 can be modified as numerical formula 3 (shown as Formula 3).

$$k_i = \frac{J}{K_t}\omega_n^2 = \left(\frac{J_m}{K_t}\omega_{n0}^2\right) \times \left(1 + \frac{J_L}{J_m}\right) \times \left(\frac{\omega_n}{\omega_{n0}}\right)^2 \quad \text{[Formula 3]}$$

$$k_p = \frac{2\zeta J}{K_t}\omega_n = \left(\frac{2\zeta J_m}{K_t}\omega_{n0}\right) \times \left(1 + \frac{J_L}{J_m}\right) \times \left(\frac{\omega_n}{\omega_{n0}}\right)$$

The initial value of integral gain and initial value of proportional gain are decided in advance by a certain standard responsiveness for every motor model. The initial value of the integral gain is decided as in numerical formula 4 below (shown as Formula 4), and the initial value of the proportional gain is decided as in numerical formula 5 (shown as Formula 5).

$$\frac{J_m}{K_t}\omega_{n0}^2 \quad \text{[Formula 4]}$$

-continued $$\frac{2\zeta J_m}{K_t}\omega_{n0} \quad \text{[Formula 5]}$$

Conventionally, adjustment of the velocity control loop has been performed by raising the proportional gain and integral gain by the same magnification. Although this is correct if considering the load inertia ratio, when also adjusting the responsiveness according to this, there has been a problem in that the damping characteristic changes according to the gain magnification. In addition, since the boundary of the velocity gain is limited by only the proportional gain, it has not been possible to adopt a high integral gain.

In the case of delay time not existing in the velocity control loop with Patent Document 1, as already explained, the integral gain has increased by the square of the proportional gain magnification in order to increase the responsiveness while keeping the damping characteristic constant. However, since delay exists such as the delay due to responsiveness of the current control loop which is inside of the velocity control loop, the delay in the signal of the velocity detector, and the delay due to the computation period of the velocity control loop, when increasing the integral gain by the square of the proportional gain magnification, the velocity gain will be limited by the boundary according to only the integral gain, and thus it has not been possible to adopt a sufficiently high proportional gain.

Figure 1:
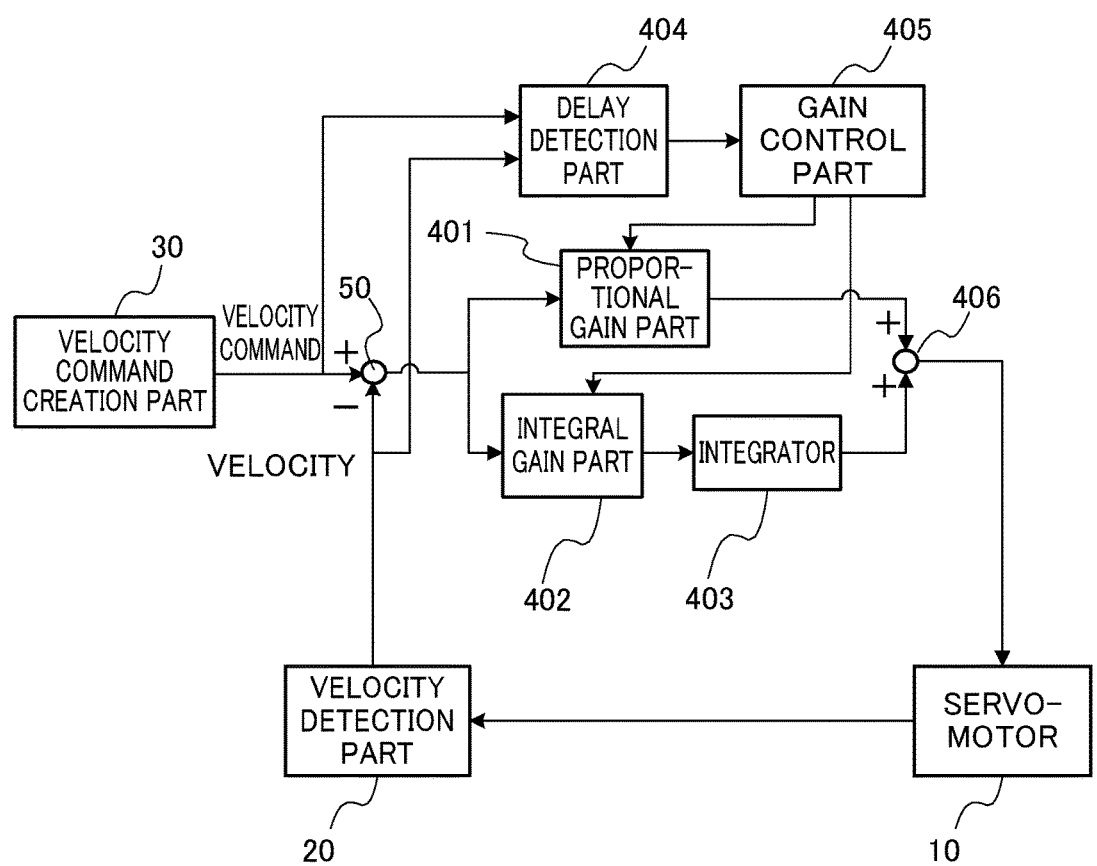
FIG. 1 is a block diagram showing a servomotor control device and servomotor of an embodiment of the present invention.

Hereinafter, an embodiment of the present invention will be explained in detail using the drawings. FIG. 1 is a block diagram showing a servomotor control device and servomotor of an embodiment of the present invention. The servomotor control device shown in FIG. 1 includes a velocity detection part 20 that detects the rotational velocity of a servomotor 10 and outputs a velocity value, a velocity command creation part 30 that creates and outputs a velocity command to the servomotor 10, a torque command creation part 40, and a subtracter that obtains the difference between the velocity command value and velocity value. The torque command creation part 40 includes: a proportional gain part 401 and integral gain part 402, which are connected to the subtracter 50; an integrator 403 connected to the integral gain part 402; a delay detection part 404 that uses the velocity command and the detected velocity to detect the delay time occurring in the velocity control loop; a gain control part 405 that adjusts the gains of the proportional gain part 401 and integral gain part 402; and an adder 406 that adds the output of the proportional gain part 401 and the output of the integrator 403, and outputs the added value as the torque command to the servomotor 10. The integral gain part 402 multiplies the input by a coefficient, and the integrator 403 integrates the output of the integral gain part 402. The proportional gain part 401 multiplies the input by a coefficient. The gain control part 405 controls the integral gain part 402 so as to set the integral gain magnification as a value smaller than the square of the proportional gain magnification, according to the detected delay time. The servomotor 10 drives the shaft of a machine tool or an industrial machine.

In the case of delay time existing in the velocity control loop, when increasing the integral gain magnification by the square of the proportion gain magnification, it has been found that the integral gain becomes excessive as increasing the magnification. If the integral gain becomes excessive, the overshoot will increase to become oscillatory. By multiplying the integral gain by a value that is smaller than the square of the proportional gain magnification according to the delay time (establishing integral gain magnification<square of proportional gain magnification), the present inventors have found that it is possible to raise responsiveness without significantly changing the damping characteristic.

In order to set the integral gain magnification as a value smaller than the square of the proportional gain magnification, in the present embodiment, the integral gain magnification is obtained by the equation of (integral gain magnification)=(proportional gain magnification)$^\beta$ ($1 \leq \beta < 2$). However, these methods shown in the present embodiment are examples, and the integral gain magnification may become a value smaller than the square of the proportional gain magnification by another method. The value $\beta$ can be decided using the delay time occurring in the velocity control loop. The delay time occurring in the velocity control loop occurs due to the delay according to the responsiveness of the current control loop, the delay in the signal of the velocity detector, the delay due to the computation period of the velocity control loop, etc. as already explained; however, this delay is decided by the motor characteristics and the characteristics of the circuit constituting the velocity control loop, and can be determined in advance. Consequently, the value $\beta$ can also be decided in advance.

The present embodiment takes account of the fluctuations in delay time occurring in the velocity control loop, and the delay detection part 404 detects the delay time occurring in the velocity control loop using the velocity command and the detected velocity. The delay time occurring in the velocity control loop can be detected by measuring the delay time of the velocity feedback relative to the velocity command. In the case of deciding the value $\beta$ in advance, the delay detection part 404 in FIG. 1 is unnecessary.

In the case of increasing the integral gain magnification by the $\beta$-th power of the proportional gain magnification, the integral gain $k_i$ and proportion gain $k_p$ can be represented by numerical formula 6 (shown as Formula 6).

$$k_i = \frac{J}{K_t}\omega_n^2 = \left(\frac{J_m}{K_t}\omega_{n0}^2\right) \times \left(1 + \frac{J_L}{J_m}\right) \times \left(\frac{\omega_n}{\omega_{n0}}\right)^\beta \quad \text{[Formula 6]}$$

$$k_p = \frac{2\zeta J}{K_t}\omega_n = \left(\frac{2\zeta J_m}{K_t}\omega_{n0}\right) \times \left(1 + \frac{J_L}{J_m}\right) \times \left(\frac{\omega_n}{\omega_{n0}}\right)$$

Figure 6:
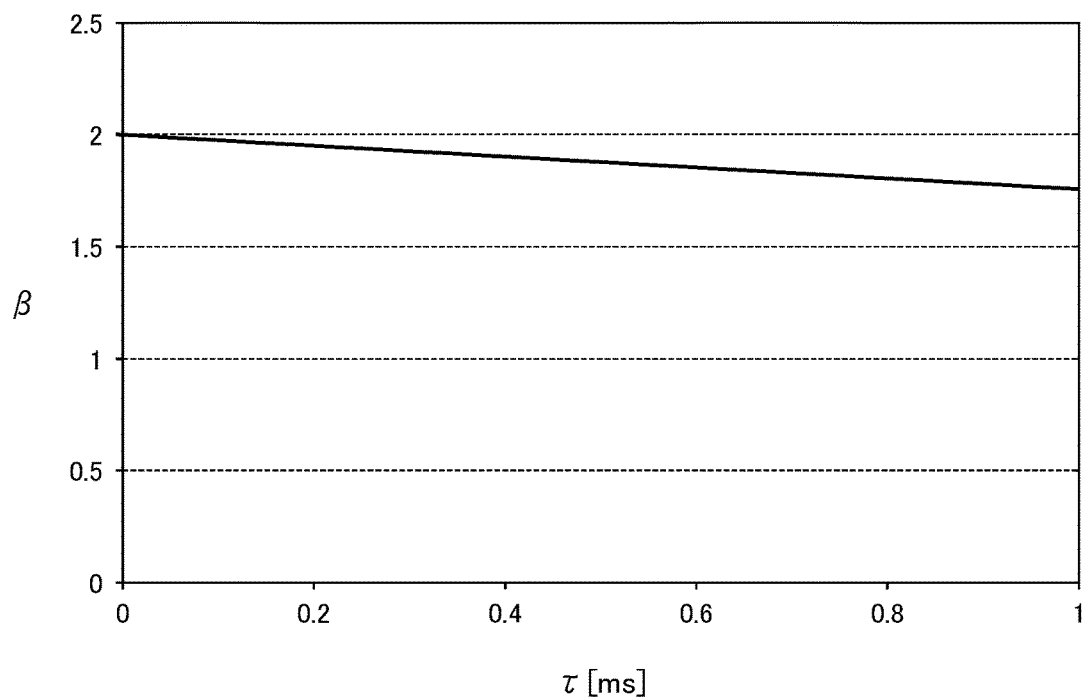
FIG. 6 is a characteristic diagram showing the relationship between a value β and delay time τ.

According to the expertise from the present inventors, the integral gain magnification can be obtained by the equation of integral gain magnification=$\beta$-th power of proportional gain magnification ($1 \leq \beta < 2$), as in numerical formula 6 above. In addition, according to expertise from the present inventors, the value $\beta$ can be represented by the linear function of $\beta = 2 - \alpha\tau$, using the delay time $\tau$ and constant $\alpha$. Using this relationship, it is possible to obtain the value $\beta$ from the delay time $\tau$. The constant $\alpha$ is a fixed value, and can assume a value of approximately $\alpha = 0.25$. An example of the relationship between the value $\beta$ and the delay time $\tau$ is shown in the characteristic chart of FIG. 6. The ratio $\omega_n/\omega_{n0}$ shown in numerical formula 3 and numerical formula 6 is a velocity gain magnification VG. The proportional gain magnification becomes the velocity gain magnification VG ($VG = \omega_n/\omega_{n0}$), and the integral gain magnification becomes the $\beta$-th power of the velocity gain magnification VG ($VG^\beta = (\omega_n/\omega_{n0})^\beta$). Although it is possible for the subtracted amount of the integral gain magnification and/or value $\beta$ to be decided in advance during delivery, the velocity gain magnification VG cannot be decided in advance during delivery due to being influenced by the machine characteristics, and thus is set appropriately in accordance with the characteristics of the machine tool, etc. connected to the servomotor.

FIG. 2 is a flowchart showing operation of the servomotor control device shown in FIG. 1. First, in Step S101, the velocity command creation part 30 creates a velocity command, and the velocity detection part 20 detects the velocity in Step S102. Next, in Step S103, the initial value decided in advance for every motor model is multiplied by a coefficient $(1+J_L/J_m)$ established using the ratio of the load inertia of machinery relative to rotor inertia (shown as load inertia ratio in Step S103 of FIG. 2), and the integral gain and proportional gain are obtained by multiplying the adjusted integral gain magnification and proportional gain magnification, respectively. Next, in Step S104, the subtracter 50 obtains the difference between the velocity command value and velocity value, and the torque command is created and outputted using this difference by adding the output value of the integrator 403 produced by integrating the output values of the integral gain part 402 and the output values of the proportional gain part 401 with the adder 406.

FIG. 3 is a flowchart showing the method for obtaining the velocity gain. The value β is obtained from the motor characteristics and the characteristics of the circuit constituting the velocity control loop (Step S201). Next, it is determined whether there is a stability margin in gain (Step S202). In the case of there being a stability margin, the velocity gain magnification is made larger (Step S203), and the processing returns to Step S202. In the case of there not being a stability margin, the velocity gain magnification initially set is maintained.

FIG. 4 is a block diagram showing the velocity command creation part, position detection part, position command creation part, and servomotor. The position command creation part 70 creates a position command, and the position detection part 60 detects the rotational position of the servomotor 10. The subtracter 80 obtains the difference between the position command value and position, and inputs this difference to the position control gain part 301 and derivative part 302. The adder 304 outputs the added value of the output of the coefficient part 303 multiplying the output of the derivative part 302 by a coefficient, and the output of the position control gain part 301, as a velocity command.

Although an embodiment of the present invention has been explained above, for the servomotor control device, the entirety or a part of the functions thereof can be realized by way of hardware, software or a combination thereof. Herein, being realized by way of software indicates being realized by a computer reading out and executing programs. In the case of constituting by hardware, a part or the entirety of the velocity command creation part 30 and torque command creation part 40 of the servo control device shown in FIGS. 1 and 4 can be constituted by integrated circuits (IC) such as LSI (Large Scale Integrated circuit), ASIC (Application Specific Integrated Circuit), gate array, and FPGA (Field Programmable Gate Array).

In the case of realizing by software, a part or the entirety of the servomotor control device is constituted by a computer including a CPU, and a storage unit such as a hard disk and ROM storing programs. Then, in accordance with the block diagram of FIG. 1 and programs following the flowcharts of FIGS. 2 and 3, the CPU can execute a part or the entirety of the operations of the servomotor control device, by storing the information required in computation on a second storage unit such as RAM, and executing the processing. The programs can be read into the storage unit such as a hard disk from computer-readable recording media on which the programs are recorded.

The programs can be stored using various types of computer-readable recording media (computer readable media), and provided to the computer. The computer-readable recording media includes non-transitory computer readable media. In addition, the computer readable recording media includes various types of tangible storage media. Examples of the non-transitory computer-readable recording media include magnetic media (for example, flexible disk, magnetic tape, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)).

Although the respective embodiments and examples of the present invention have been explained above, the present invention is not to be limited to the aforementioned respective embodiments and examples, and for one skilled in the art, it is possible to modify or change into various forms within a scope not departing from the gist of the present invention, based on the disclosure in the claims, and these modified examples or changed examples also fall under the scope of rights of the present invention.

EXPLANATION OF REFERENCE NUMERALS 10 servomotor
20 velocity detection part
30 velocity command creation part
40 torque command creation part
50 subtracter
60 position detection part
70 position command creation part
80 adder
401 proportional gain part
402 integral gain part
403 integrator
404 delay detection part
405 gain control part
406 adder

What is claimed is:
1. A servomotor control device comprising:
a velocity command creation part configured to create a velocity command value for driving a servomotor;
a velocity detection part configured to detect velocity of the servomotor; and
a torque command creation part configured to create a torque command value to the servomotor using a difference between a velocity command value created by the velocity command creation part and a velocity detection value detected by the velocity detection part,
wherein a velocity control loop includes the velocity detection part and the torque command creation part,
wherein the torque command creation part includes an integral gain part and a proportional gain part to which the difference is inputted, respectively,
wherein integral gain of the integral gain part and proportional gain of the proportional gain part are obtained by multiplying a value calculated by multiplying an initial value decided in advance for every motor model by a coefficient established using a ratio of load inertia of a machine relative to rotor inertia of the servomotor, by an integral gain magnification and a proportional gain magnification, respectively, and wherein the integral gain magnification is set to a value smaller than the square of the proportional gain magnification according to a delay time of the velocity control loop.

2. The servomotor control device according to claim 1, wherein the integral gain magnification is the β-th power of the proportional gain magnification, and the β is a constant assuming a value of one or more and less than two according to the delay time of the velocity control loop.

3. The servomotor control device according to claim 2, wherein the constant β is defined, using a time delay τ of the velocity control loop and a constant α, as β=2−ατ.

4. The servomotor control device according to claim 1, further comprising:
a position command creation part configured to create a position command value for the servomotor; and
a position detection part configured to detect a position of the servomotor,
wherein the velocity command creation part creates a velocity command value using a difference between the position command value created by the position command creation part, and a position detection value detected by the position detection part.

5. A servomotor control method for a servomotor control device, the method comprising the steps of:
creating a velocity command value for driving a servomotor;
detecting velocity of the servomotor; and
creating a torque command value to the servomotor using a difference between the velocity command value thus created and a velocity detection value thus detected,
wherein the servomotor is controlled according to the torque command value,
wherein at least the step of detecting velocity and the step of creating the torque command value is performed in a velocity control loop
wherein the step of creating the torque command value includes a step of multiplying the difference by an integral gain and a proportional gain, respectively,
wherein the integral gain and the proportional gain are obtained by multiplying a value calculated by multiplying an initial value decided in advance for every motor model by a coefficient established using a ratio of load inertia of a machine relative to rotor inertia of the servomotor, by an integral gain magnification and a proportional gain magnification, respectively, and
wherein the integral gain magnification is a value smaller than the square of the proportional gain magnification according to a delay time of the velocity control loop.

6. The servomotor control method according to claim 5, wherein the integral gain magnification is the β-th power of the proportional gain magnification, and
the β is a constant assuming a value of one or more and less than two according to the delay time of the velocity control loop.

7. The servomotor control method according to claim 6, wherein the constant β is defined, using time delay τ of the velocity control loop and a constant α, as β=2−ατ.

8. The servomotor control method according to claim 5, further comprising the steps of:
creating a position command value for the servomotor; and
detecting a position of the servomotor,
wherein the step of creating the velocity command value creates a velocity command value using a difference between the position command value created by the position command creation part, and a position detection value detected by the position detection part.

9. A non-transitory computer-readable recording medium storing a servomotor control program for enabling a computer, serving as a servomotor control device that controls a servomotor, to execute processing of:
creating a velocity command value for driving the servomotor;
detecting a velocity of the servomotor; and
creating a torque command value for the servomotor using a difference between the velocity command value thus created and a velocity detection value thus detected,
wherein at least the processing of detecting the velocity and the processing of creating the torque command value is executed in a velocity control loop,
wherein the processing of creating the torque command value multiplies the difference by the integral gain and the proportional gain, respectively,
wherein the integral gain and the proportional gain are obtained by multiplying a value calculated by multiplying an initial value decided in advance for every motor model by a coefficient established using a ratio of load inertia of a machine relative to rotor inertia of the servomotor, by an integral gain magnification and a proportional gain magnification, respectively, and
wherein the integral gain magnification is a value smaller than the square of the proportional gain magnification according to a delay time of the velocity control loop.

* * * * *